United States Patent
Takamoto et al.

(10) Patent No.: US 11,146,784 B2
(45) Date of Patent: Oct. 12, 2021

(54) ABNORMALITY DETECTION DEVICE AND ABNORMALITY DETECTION METHOD

(71) Applicant: MITSUBISHI ELECTRIC CORPORATION, Tokyo (JP)

(72) Inventors: Shusaku Takamoto, Tokyo (JP); Takeo Fujita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/964,844

(22) PCT Filed: Feb. 16, 2018

(86) PCT No.: PCT/JP2018/005490
§ 371 (c)(1),
(2) Date: Jul. 24, 2020

(87) PCT Pub. No.: WO2019/159321
PCT Pub. Date: Aug. 22, 2019

(65) Prior Publication Data
US 2021/0067768 A1 Mar. 4, 2021

(51) Int. Cl.
*H04N 7/18* (2006.01)
*H04N 17/00* (2006.01)
(Continued)

(52) U.S. Cl.
CPC ............. *H04N 17/002* (2013.01); *B60Q 1/24* (2013.01); *B60R 25/10* (2013.01); *B60R 25/305* (2013.01);
(Continued)

(58) Field of Classification Search
CPC ...... H04N 7/18; H04N 17/002; H04N 5/2351; H04N 17/00; H04N 5/21; G06T 7/97;
(Continued)

(56) References Cited

U.S. PATENT DOCUMENTS 7,596,242 B2* 9/2009 Breed ................ G06K 9/00362
382/103
8,831,922 B2* 9/2014 Sakakibara .......... G07C 5/0816
703/8
(Continued)

FOREIGN PATENT DOCUMENTS

CN 102030232 A 4/2011
JP 2006-157739 A 6/2006
(Continued)

OTHER PUBLICATIONS

Office Action dated May 20, 2021 in corresponding Chinese Application No. 2018 800 8997.7.

*Primary Examiner* — Trang U Tran
(74) *Attorney, Agent, or Firm* — Birch, Stewart, Kolasch & Birch, LLP

(57) ABSTRACT

An abnormality detection device includes processing circuitry configured to calculate an index value indicating a sum of edge strengths in a second image that is an image captured by a camera for capturing a vehicle compartment at timing before a user enters a vehicle, calculate a differential value between an index value indicating a sum of edge strengths in a reference image, which is an image captured by the camera under an imaging condition equivalent to an imaging condition of the second image before the second image is captured, and the calculated index value, determine whether the differential value is equal to or greater than a threshold value, and execute control to output a warning in a case where it is determined that the differential value is equal to or greater than the threshold value.

9 Claims, 5 Drawing Sheets

(51) Int. Cl.
  *G06T 7/00*    (2017.01)
  *B60Q 1/24*    (2006.01)
  *B60R 25/10*   (2013.01)
  *B60R 25/30*   (2013.01)
  *H04N 5/235*   (2006.01)

(52) U.S. Cl.
  CPC .............. *G06T 7/0002* (2013.01); *G06T 7/97* (2017.01); *H04N 5/2351* (2013.01); *H04N 7/18* (2013.01); *G06T 2207/30168* (2013.01); *G06T 2207/30268* (2013.01)

(58) Field of Classification Search
  CPC ......... G06T 7/0002; G06T 2207/30168; G06T 2207/30268; B60Q 1/24; B60R 25/10; B60R 25/305
  USPC .................. 348/148, 192, 180, 189; 382/104
  See application file for complete search history.

(56) References Cited

U.S. PATENT DOCUMENTS

| | | |
|---|---|---|
| 2006/0115121 A1 | 6/2006 | Saka et al. |
| 2008/0317356 A1 | 12/2008 | Itoh et al. |
| 2011/0235925 A1 | 9/2011 | Itoh et al. |

FOREIGN PATENT DOCUMENTS

| | | |
|---|---|---|
| JP | 2007-22360 A | 2/2007 |
| JP | 2009-005198 A | 1/2009 |

\* cited by examiner

ABNORMALITY DETECTION DEVICE AND ABNORMALITY DETECTION METHOD

TECHNICAL FIELD

The present invention relates to an abnormality detection device and an abnormality detection method.

BACKGROUND ART

In the related art, technology has been developed which detects occurrence of an abnormality in a lens of a camera (for example, a water droplet thereon, adhesion of dirt such as a fingerprint, or a scratch) using a feature amount in an image captured by the camera as an index value. For example, Patent Literature 1 discloses technique for detecting adhesion of dirt on a lens of a camera for capturing images outside a vehicle using a brightness dispersion value in an image captured by the camera as an index value.

CITATION LIST

Patent Literature

Patent Literature 1: JP 2006-157739 A

SUMMARY OF INVENTION

Technical Problem

In recent years, a so-called "occupant monitoring system" employs a camera for imaging the vehicle compartment. When there is an abnormality such as adhesion of dirt or a scratch in a lens of the camera for imaging the vehicle compartment, the edge strength drops in an area corresponding to the abnormality in a captured image, and a so-called "blur" occurs. Due to the occurrence of the blur, the accuracy of image processing on the area is reduced. For this reason, it is preferable to apply technique for detecting occurrence of an abnormality in the lens.

Normally, user's clothing and accessories that the user wears are different each time the user enters the vehicle. Therefore, the subject of the camera for imaging the vehicle compartment at the timing after the user enters the vehicle changes each time the user enters the vehicle. As a result, the feature amount in captured images also differs each time the user enters the vehicle. In a case where conventional abnormality detection technology is applied to a camera for imaging the vehicle compartment, there are disadvantages in that an abnormality is detected due to fluctuations in the feature amount depending on changes in the subject even though no such abnormality is occurring in the lens or in that no abnormality is detected even when an abnormality is occurring in the lens. That is, the detection accuracy is disadvantageously low.

The present invention has been devised in order to solve the disadvantages as described above, and an object of the invention is to improve the detection accuracy in a device and a method for detecting occurrence of an abnormality in a lens of a camera for imaging a vehicle compartment using a feature amount in an image captured by the camera as an index value.

Solution to Problem

An abnormality detection device of the present invention includes: processing circuitry configured to calculate an index value indicating a sum of edge strengths in a second image that is an image captured by a camera for capturing a vehicle compartment at timing before a user enters a vehicle, calculate a differential value between an index value indicating a sum of edge strengths in a reference image, which is an image captured by the camera under an imaging condition equivalent to an imaging condition of the second image before the second image is captured, and the calculated index value, determine whether the differential value is equal to or greater than a threshold value, and execute control to output a warning in a case where it is determined that the differential value is equal to or greater than the threshold value.

Advantageous Effects of Invention

According to the present invention with the configuration as described above, it is possible to improve the detection accuracy in a device and a method for detecting occurrence of an abnormality in a lens of a camera for imaging a vehicle compartment using a feature amount in an image captured by the camera as an index value.

DESCRIPTION OF EMBODIMENTS

To describe the present invention further in detail, embodiments for carrying out the present invention will be described below with reference to the accompanying drawings.

First Embodiment

Figure 1:
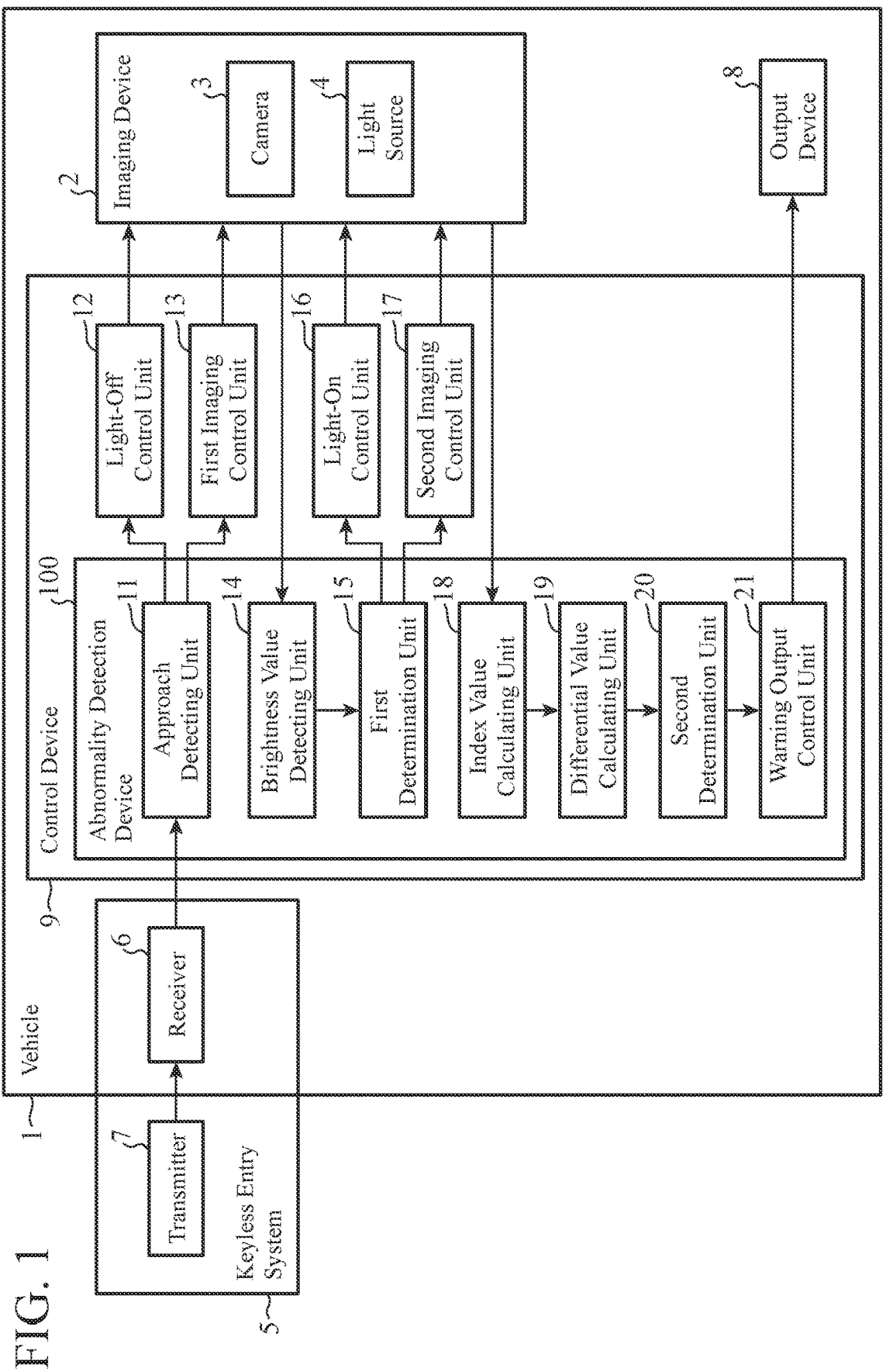
FIG. 1 is a block diagram illustrating a state where a control device including an abnormality detection device according to a first embodiment of the present invention is provided in a vehicle.

FIG. 1 is a block diagram illustrating a state where a control device including an abnormality detection device according to a first embodiment is provided in a vehicle. With reference to FIG. 1, an abnormality detection device 100 of the first embodiment will be described.

An imaging device 2 for an occupant monitoring system is provided in a front portion of the compartment of a vehicle 1. The imaging device 2 includes a camera 3 and a light source 4. The camera 3 is for capturing images of the vehicle compartment, and is, for example, an infrared camera or a visible light camera. The light source 4 is for imaging by the camera 3, and is, for example, a light emitting diode (LED).

Seats to be imaged by the camera 3 include the driver seat of the vehicle 1, the driver seat and the front passenger seat of the vehicle 1 (hereinafter collectively referred to as "front seats"), or the front and rear seats of the vehicle 1 (hereinafter collectively referred to as "all seats"). In a case where the front seats or all the seats are to be imaged, the camera 3 is arranged at the center in the left-right direction of the vehicle 1 at the front portion of the compartment of the vehicle 1. In a case where the driver seat is to be imaged, the camera 3 is arranged in front of the driver seat at the front portion of the compartment of the vehicle 1.

The vehicle 1 is provided with a receiver 6 for a keyless entry system 5. A user of the vehicle 1 (hereinafter, simply referred to as a "user") carries a transmitter 7 for the keyless entry system 5. The receiver 6 receives a radio signal or an infrared signal for unlocking (hereinafter, referred to as an "unlock signal") transmitted by the transmitter 7. The receiver 6 also receives a radio signal or an infrared signal for locking (hereinafter, referred to as a "lock signal") transmitted by the transmitter 7. The keyless entry system 5 unlocks each door of the vehicle 1 when the receiver 6 receives an unlock signal. The keyless entry system 5 also locks each door of the vehicle 1 when the receiver 6 receives a lock signal.

Figure 2:
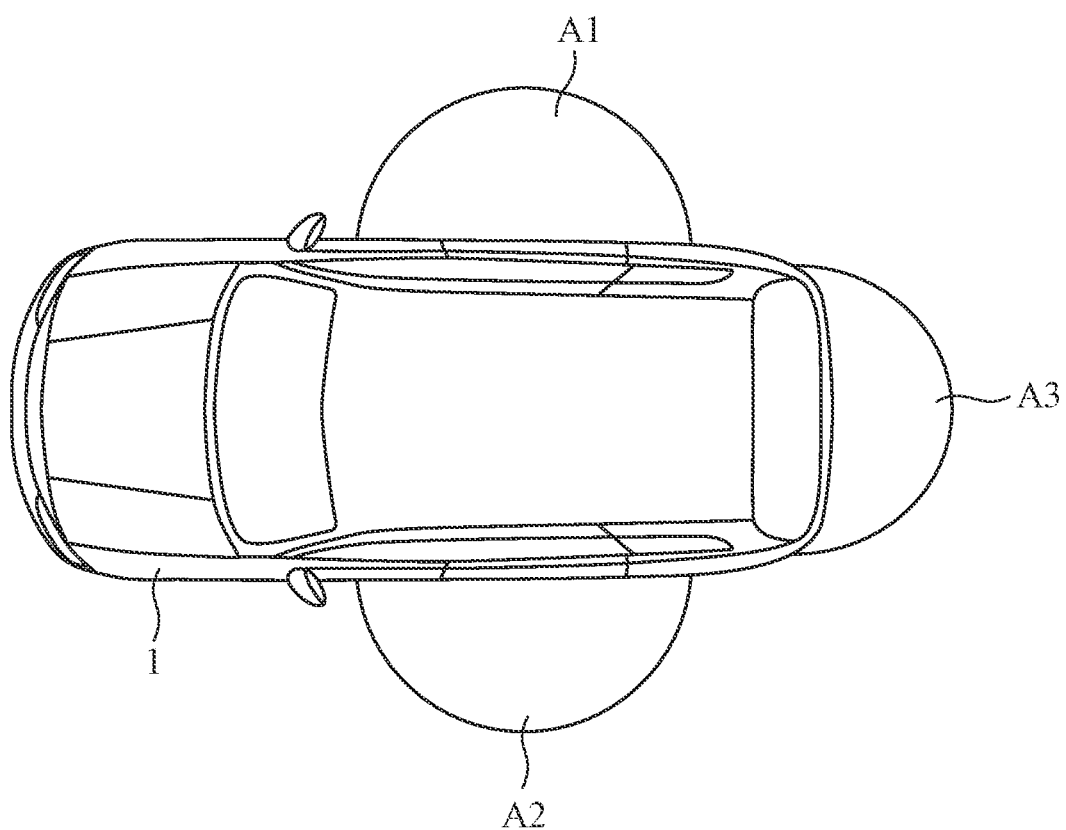
FIG. 2 is an explanatory diagram illustrating an example of a reception area of a receiver for a keyless entry system.

Illustrated in FIG. 2 is an example of an area in which the receiver 6 can receive an unlock signal and a lock signal (hereinafter, referred to as a "reception area"). As illustrated in FIG. 2, the vehicle 1 is a so-called "right-hand drive" vehicle, and an area A1 around the door on the driver seat side of the vehicle 1, an area A2 around the door on the front passenger seat side of the vehicle 1, and an area A3 behind the vehicle 1 are set as a reception area.

The receiver 6 has a function of outputting a predetermined signal (hereinafter, referred to as an "output signal") to an approach detecting unit 11 when an unlock signal is received. The approach detecting unit 11 uses the output signal of the receiver 6 to detect that a user has approached the vehicle 1, more specifically, that the user has entered the reception area. That is, timing at which the approach of the user is detected by the approach detecting unit 11 is before the user enters the vehicle 1.

A light-off control unit 12 turns off the light source 4 when the approach detecting unit 11 detects the approach of the user. A first imaging control unit 13 instructs the camera 3 to capture an image (hereinafter, referred to as a "first image") when the approach detecting unit 11 detects the approach of the user. That is, the first image is captured at timing before the user enters the vehicle 1. The first image is captured while the light source 4 is turned off.

A brightness value detecting unit 14 acquires image data indicating the first image (hereinafter, referred to as "first image data") from the camera 3. The brightness value detecting unit 14 detects a brightness value in the first image using the first image data.

The first determination unit 15 uses the brightness value detected by the brightness value detecting unit 14 to determine whether the amount of external light that enters the compartment of the vehicle 1 from outside the vehicle 1 (hereinafter, simply referred to as "external light") is less than a predetermined amount (hereinafter, referred to as the "reference amount").

More specifically, the first determination unit 15 stores in advance a value to be compared with the brightness value detected by the brightness value detecting unit 14 (hereinafter, referred to as the "reference value"). This reference value is set to a value that corresponds to the reference amount. The first determination unit 15 compares the reference value stored in advance with the brightness value detected by the brightness value detecting unit 14 to determine whether the brightness value is less than the reference value. In a case where the brightness value is less than the reference value, the first determination unit 15 determines that the amount of external light is less than the reference amount.

A light-on control unit 16 turns on the light source 4 when the first determination unit 15 determines that the amount of external light is less than the reference amount. A second imaging control unit 17 instructs the camera 3 to capture an image (hereinafter, referred to as the "second image") when the first determination unit 15 determines that the amount of external light is less than the reference amount. That is, the second image is captured at timing before the user enters the vehicle 1. The second image is captured in a state where the amount of external light is less than the reference amount and while the light source 4 is turned on.

An index value calculating unit 18 acquires image data indicating the second image (hereinafter, referred to as "second image data") from the camera 3. The index value calculating unit 18 calculates an index value indicating the sum of edge strengths in the second image using the second image data.

A differential value calculating unit 19 stores in advance an index value indicating the sum of edge strengths in an image captured by the camera 3 at the time of factory shipment of the vehicle 1 (hereinafter, referred to as the "reference image"). The differential value calculating unit 19 calculates a differential value between the index value stored in advance and the index value calculated by the index value calculating unit 18. The differential value calculated by the differential value calculating unit 19 indicates the amount of decrease in the edge strength in the second image as compared to the edge strength in the reference image.

Here, the reference image has been captured under imaging conditions equivalent to imaging conditions of the second image. That is, the reference image has been captured in a state where the user has not entered the vehicle 1 (more specifically, no individual is seated on a seat to be imaged by the camera 3), and the amount of external light is less than the reference amount, and while the light source 4 is turned on.

In other words, the second image is captured under imaging conditions equivalent to the imaging conditions of the reference image. That is, the second image is captured at timing before the user enters the vehicle 1. The second image is captured in a state where the amount of external light is less than the reference amount and while the light source 4 is turned on.

A second determination unit 20 stores in advance a threshold value to be compared with the differential value calculated by the differential value calculating unit 19. This threshold value is set to a value that serves to discriminate between presence and absence of occurrence of an abnormality in a lens of the camera 3 (for example, adhesion of a water droplet, adhesion of dirt such as a fingerprint, or a scratch). The second determination unit 20 compares the threshold value stored in advance with the differential value calculated by the differential value calculating unit 19 to determine whether the differential value is equal to or larger than the threshold value. That is, the second determination unit 20 determines whether the amount of decrease in the edge strength in the second image as compared to the edge strength in the reference image is equal to or larger than the threshold value.

The warning output control unit 21 executes control for outputting a warning using an output device 8 when the second determination unit 20 determines that the differential value is equal to or larger than the threshold value.

Specifically, for example, the output device 8 includes a display. When the second determination unit 20 determines that the differential value is equal to or greater than the threshold value, the warning output control unit 21 causes the display to display an image including content that prompts cleaning or inspection of the lens of the camera 3 (hereinafter, referred to as a "warning image").

Alternatively, for example, the output device 8 includes a speaker. When the second determination unit 20 determines that the differential value is equal to or greater than the threshold value, the warning output control unit 21 causes the speaker to output a speech including content that prompts cleaning or inspection of the lens of the camera 3 (hereinafter, referred to as a "warning speech").

Alternatively, for example, the output device 8 includes a dedicated indicator (hereinafter, referred to as a "warning indicator"). The warning output control unit 21 turns on the warning indicator when the second determination unit 20 determines that the differential value is equal to or greater than the threshold value.

The approach detecting unit 11, the light-off control unit 12, the first imaging control unit 13, the brightness value detecting unit 14, the first determination unit 15, the light-on control unit 16, the second imaging control unit 17, the index value calculating unit 18, the differential value calculating unit 19, the second determination unit 20, and the warning output control unit 21 are included as the main part of a control device 9. Moreover, the approach detecting unit 11, the brightness value detecting unit 14, the first determination unit 15, the index value calculating unit 18, the differential value calculating unit 19, the second determination unit 20, and the warning output control unit 21 are included as the main part of the abnormality detection device 100.

Next, hardware configurations of the main part of the control device 9 will be described with reference to FIG. 3.

Figure 3A:
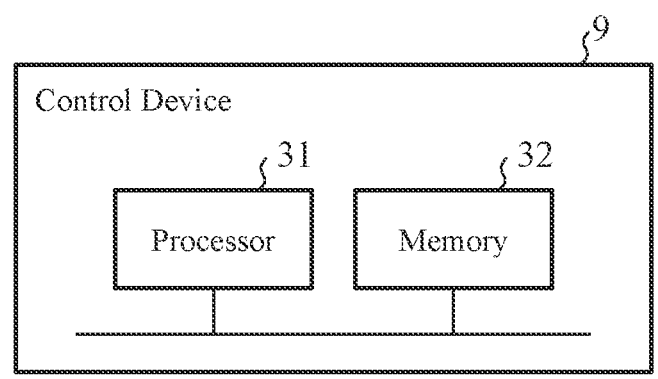
FIG. 3A is a block diagram illustrating a hardware configuration of the main part of the control device including the abnormality detection device according to the first embodiment of the present invention.

As illustrated in FIG. 3A, the control device 9 includes a computer, and the computer includes a processor 31 and a memory 32. The memory 32 stores programs for causing the computer to function as the approach detecting unit 11, the light-off control unit 12, the first imaging control unit 13, the brightness value detecting unit 14, the first determination unit 15, the light-on control unit 16, the second imaging control unit 17, the index value calculating unit 18, the differential value calculating unit 19, the second determination unit 20, and the warning output control unit 21. Reading and executing the programs stored in the memory 32 by the processor 31 results in implementation of the functions of the approach detecting unit 11, the light-off control unit 12, the first imaging control unit 13, the brightness value detecting unit 14, the first determination unit 15, the light-on control unit 16, the second imaging control unit 17, the index value calculating unit 18, the differential value calculating unit 19, the second determination unit 20, and the warning output control unit 21.

The processor 31 includes, for example, a central processing unit (CPU), a graphics processing unit (GPU), a microprocessor, a micro controller, a digital signal processor (DSP), or the like. The memory 32 may be a semiconductor memory such as a random access memory (RAM), a read only memory (ROM), a flash memory, an erasable programmable read only memory (EPROM), or an electrically erasable programmable read only memory (EEPROM), a magnetic disc, an optical disc, or a magneto optic disc.

Figure 3B:
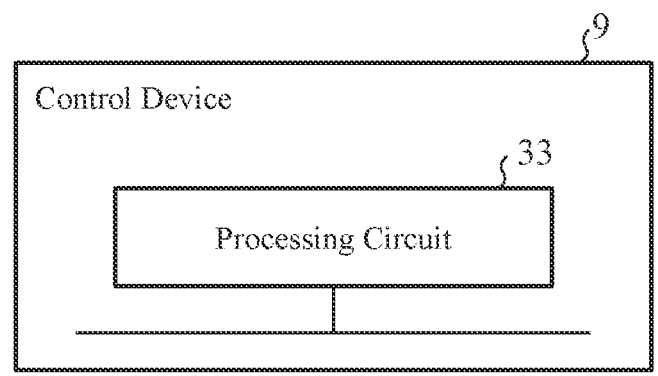
FIG. 3B is a block diagram illustrating another hardware configuration of the main part of the control device including the abnormality detection device according to the first embodiment of the present invention.

Alternatively, as illustrated in FIG. 3B, the functions of the approach detecting unit 11, the light-off control unit 12, the first imaging control unit 13, the brightness value detecting unit 14, the first determination unit 15, the light-on control unit 16, the second imaging control unit 17, the index value calculating unit 18, the differential value calculating unit 19, the second determination unit 20, and the warning output control unit 21 may be implemented by a dedicated processing circuit 33. The processing circuit 33 may be, for example, an application specific integrated circuit (ASIC), a programmable logic device (PLD), a field-programmable gate array (FPGA), a system-on-a-chip (SoC), or a system large-scale integration (LSI).

Alternatively, some of the functions of the approach detecting unit 11, the light-off control unit 12, the first imaging control unit 13, the brightness value detecting unit 14, the first determination unit 15, the light-on control unit 16, the second imaging control unit 17, the index value calculating unit 18, the differential value calculating unit 19, the second determination unit 20, and the warning output control unit 21 may be implemented by the processor 31 and the memory 32 with the remaining functions implemented by the processing circuit 33.

Figure 4:
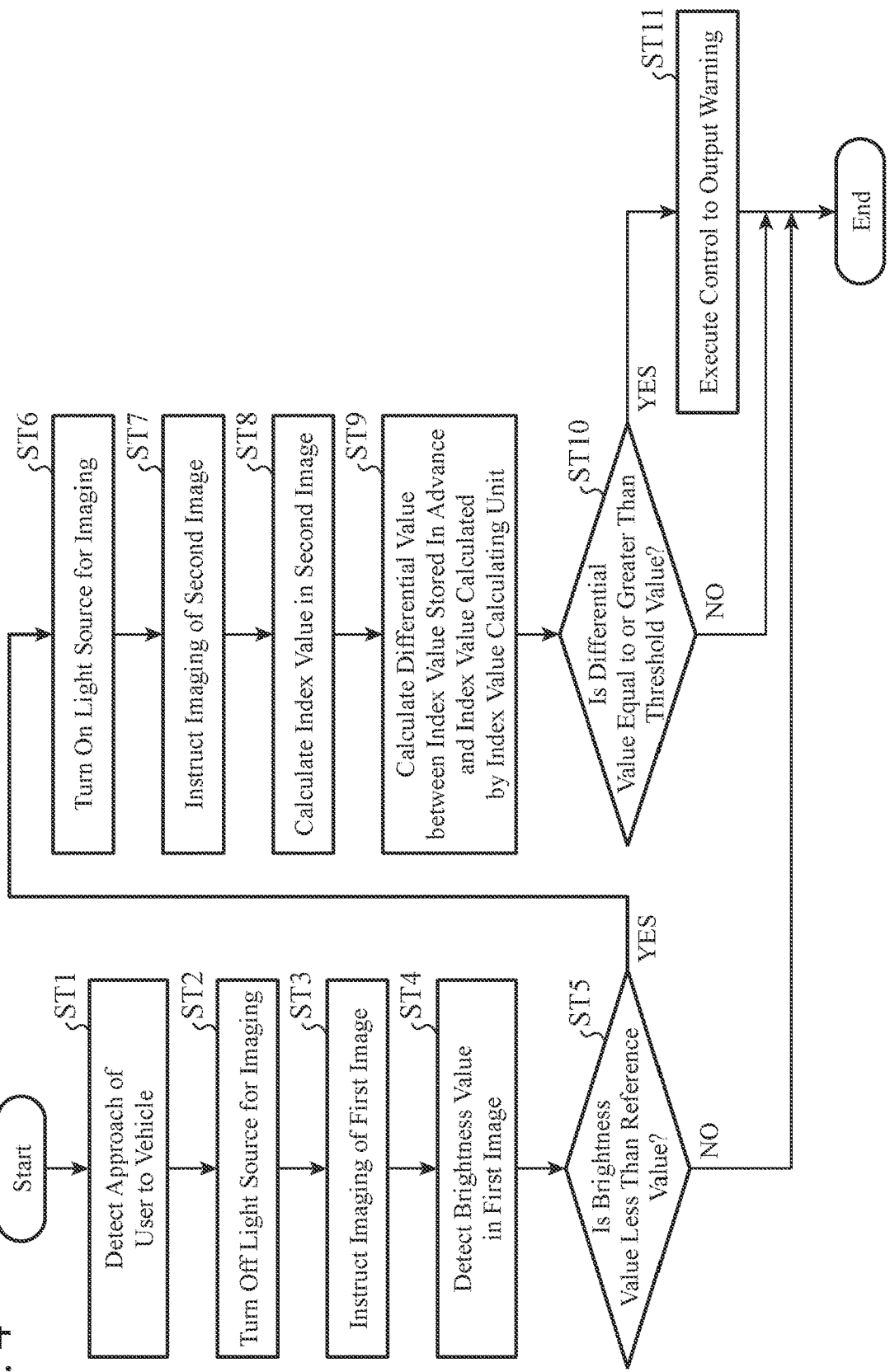
FIG. 4 is a flowchart illustrating the operation of the control device including the abnormality detection device according to the first embodiment.

Next, with reference to a flowchart of FIG. 4, the operation of the control device 9 will be described. Note that it is assumed that the user is outside the vehicle 1 and that the doors of the vehicle 1 are locked in the default state.

First, in step ST1, the approach detecting unit 11 uses an output signal of the receiver 6 to detect that a user has approached the vehicle 1, and more specifically, that the user has entered the reception area. When the approach detecting unit 11 has detected the approach of the user, the process of the control device 9 proceeds to step ST2.

Next, in step ST2, the light-off control unit 12 turns off the light source 4.

Next, in step ST3, the first imaging control unit 13 instructs the camera 3 to capture a first image. As a result, the first image is captured.

Then in step ST4, the brightness value detecting unit 14 acquires first image data from the camera 3. The brightness value detecting unit 14 detects the brightness value in the first image using the first image data.

Next, in step ST5, the first determination unit 15 determines whether the amount of external light is less than the reference amount using the brightness value detected by the brightness value detecting unit 14. More specifically, the first determination unit 15 compares the reference value stored in advance with the brightness value detected by the brightness value detecting unit 14 to determine whether the brightness value is less than the reference value. In a case where the brightness value is less than the reference value, the first determination unit 15 determines that the amount of external light is less than the reference amount.

If the first determination unit 15 determines that the brightness value is less than the reference value (step ST5 "YES"), the light-on control unit 16 turns on the light source 4 in step ST6.

Next in step ST7, the second imaging control unit 17 instructs the camera 3 to capture a second image. As a result, the second image is captured.

Next in step ST8, the index value calculating unit 18 acquires second image data from the camera 3. The index value calculating unit 18 calculates an index value indicating the sum of edge strengths in the second image using the second image data.

Next, in step ST9, the differential value calculating unit 19 calculates a differential value between the index value stored in advance and the index value calculated by the index value calculating unit 18. The differential value calculated by the differential value calculating unit 19 indicates the amount of decrease in the edge strength in the second image as compared to the edge strength in the reference image.

Next, in step ST10, the second determination unit 20 compares the threshold value stored in advance with the differential value calculated by the differential value calculating unit 19 to determine whether the differential value is equal to or larger than the threshold value. That is, the second determination unit 20 determines whether the amount of decrease in the edge strength in the second image as compared to the edge strength in the reference image is equal to or larger than the threshold value.

If the second determination unit 20 determines that the differential value is equal to or greater than the threshold value ("YES" in step ST10), the warning output control unit 21 performs control to output a warning using the output device 8 in step ST11. For example, the warning output control unit 21 causes a display to display a warning image, causes a speaker to output a warning speech, or turns on a warning indicator. On the other hand, if the second determination unit 20 determines that the differential value is less than the threshold value ("NO" in step ST10), the process of step ST11 is cancelled, and the process of the control device 9 is terminated.

Note that if the first determination unit 15 determines that the brightness value is equal to or larger than the reference value ("NO" in step ST5), the processes in and after step ST6 are cancelled, and the process of the control device 9 is terminated.

If the second image is captured in a state where the amount of external light is equal to or greater than the reference amount, the edge strength in the second image fluctuates due to the influence of external light. There is a possibility that the differential value calculated by the differential value calculating unit 19 becomes equal to or larger than the threshold value due to these fluctuations even when no abnormality is occurring in the lens of the camera 3, and that an unnecessary warning is output. On the other hand, in a case where the amount of external light is equal to or greater than the reference amount, canceling the processes from and after step ST6 can avoid output of such an unnecessary warning.

Note that the signal used for detection of the approach by the approach detecting unit 11 is not limited to the output signal from the receiver 6 for the keyless entry system 5. The approach detecting unit 11 may be any unit that detects the approach of a user to the vehicle 1 using a signal output from some system for the vehicle 1 or some network in the vehicle 1.

Furthermore, the reference image may be any image that is captured under imaging conditions equivalent to imaging conditions of the second image before the second image is captured, and is not limited to images captured at the time of factory shipment of the vehicle 1.

Furthermore, the imaging conditions at the time of capturing the reference image and the imaging conditions at the time of capturing the second image need only be partially equivalent to each other, and do not need to be identical entirely. For example, imaging conditions other than whether there is a user in the vehicle compartment, whether the amount of external light is less than the reference amount, and whether the light source 4 is turned on may be different between the time when the reference image is captured and when the second image is captured.

Figure 5:
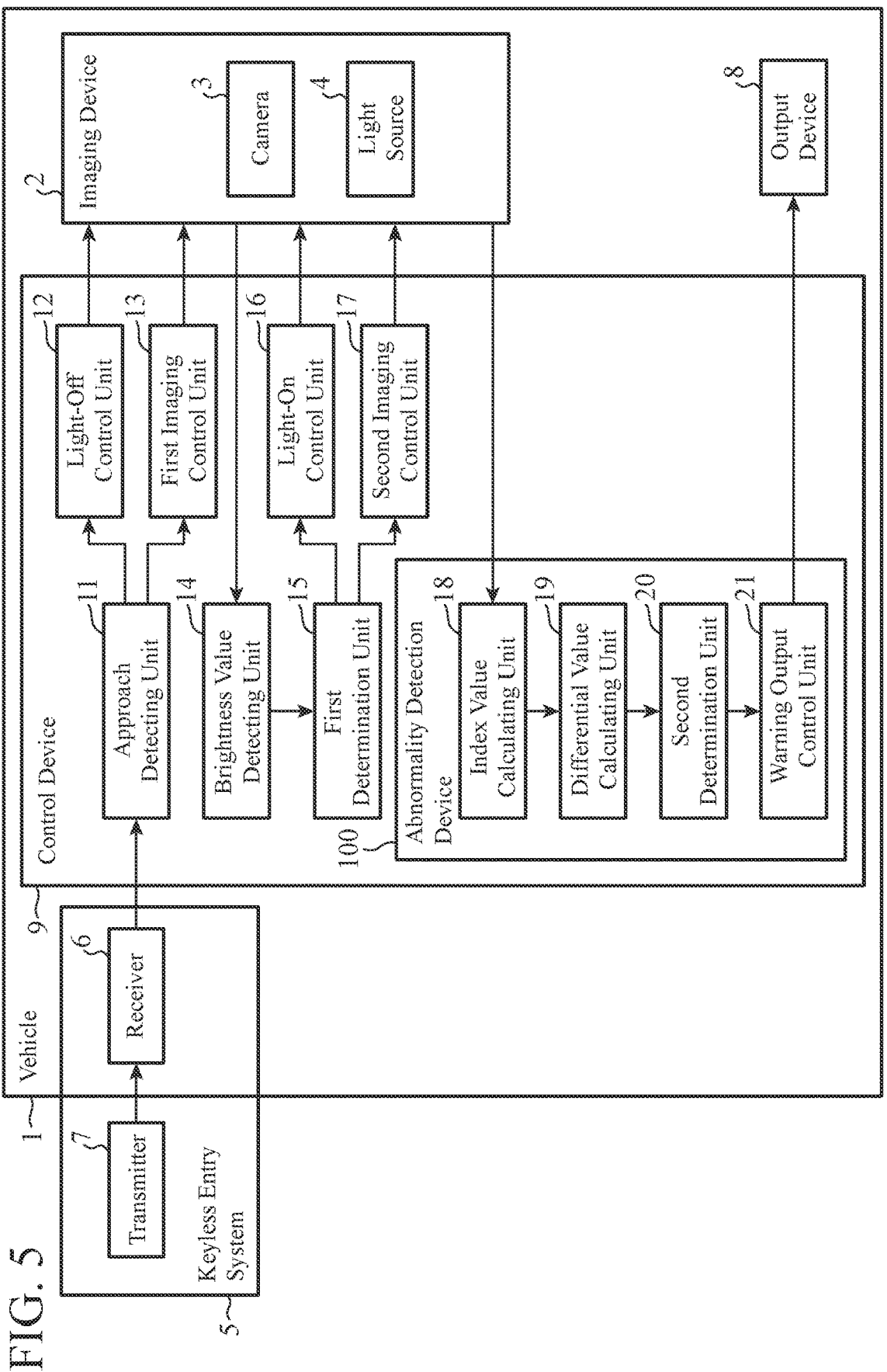
FIG. 5 is a block diagram illustrating a state in which a control device including another abnormality detection device according to the first embodiment of the present invention is provided in a vehicle.

Furthermore, each of the approach detecting unit 11, the brightness value detecting unit 14, and the first determination unit 15 may be included inside the abnormality detection device 100 as illustrated in FIG. 1 or may be provided outside the abnormality detection device 100. For example, as illustrated in FIG. 5, the approach detecting unit 11, the brightness value detecting unit 14, and the first determination unit 15 may be provided outside the abnormality detection device 100, and the index value calculating unit 18, the differential value calculating unit 19, the second determination unit 20, and the warning output control unit 21 may be included as the main part of the abnormality detection device 100.

Further alternatively, each of the approach detecting unit 11, the brightness value detecting unit 14, the first determination unit 15, the index value calculating unit 18, the differential value calculating unit 19, the second determination unit 20, and the warning output control unit 21 may be included in any of an in-vehicle information device that can be flexibly mounted on the vehicle 1, a portable information terminal that can be carried into the vehicle 1, or a server device that can freely communicate with the in-vehicle information device or the portable information terminal. That is, the main part of the abnormality detection system may be configured by any two or more of the in-vehicle information device, the portable information terminal, or the server device.

As described above, the abnormality detection device 100 according to the first embodiment includes: the index value calculating unit 18 for calculating an index value indicating a sum of edge strengths in a second image that is an image captured by the camera 3 for capturing the vehicle compartment at timing before a user enters the vehicle 1; the differential value calculating unit 19 for calculating a differential value between an index value indicating a sum of edge strengths in the reference image, which is an image captured by the camera 3 under imaging conditions equivalent to imaging conditions of the second image before the second image is captured, and the index value calculated by the index value calculating unit 18; the second determination unit 20 for determining whether the differential value is equal to or greater than a threshold value; and the warning output control unit 21 for executing control to output a warning in a case where the second determination unit 20 determines that the differential value is equal to or greater than the threshold value. By using the second image captured at the timing before the user enters the vehicle 1, it is possible to suppress occurrence of erroneous detection due to fluctuations in the edge strength that corresponds to changes in the subject (more specifically, changes in the user's clothing and accessories that the user wears). As a result, it becomes possible to avoid output of a warning despite that no abnormality is occurring in the lens of the camera 3, or to avoid that no warning is output despite occurrence of an abnormality in the lens of the camera 3.

The abnormality detection device 100 further includes the first determination unit 15 for determining whether the amount of external light entering the compartment of the vehicle 1 from outside the vehicle 1 is less than the reference amount, and the second image is captured by the camera 3 in a state where the amount of external light is less than the reference amount and the light source 4 for imaging by the camera 3 is turned on. By using the second image captured in a state where the amount of external light is less than the reference amount, it becomes possible to suppress occurrence of erroneous detection due to the influence of external light. In addition, the light amount at the time of imaging is dominated by the influence of the light source 4 than by the external light since the light amount of the light source 4 is constant and the second image is used which is captured in a state where the influence of the external light is less than the reference value and the light source 4 is turned on. Therefore, it is possible to suppress fluctuations in the illumination environment of the reference image and the second image, thereby enabling suppression of occurrence of erroneous detection caused by fluctuations in the edge strength that corresponds to changes in the illumination environment at the time of imaging. As a result, it becomes possible to avoid output of a warning despite that no abnormality is occurring in the lens of the camera 3, or to avoid that no warning is output despite occurrence of an abnormality in the lens of the camera 3.

The abnormality detection device 100 further includes the approach detecting unit 11 for detecting approach of the user to the vehicle 1 using an output signal from the receiver 6 for the keyless entry system 5, and the timing before the user enters the vehicle 1 is timing at which the approach of the user to the vehicle 1 is detected by the approach detecting unit 11. By using the keyless entry system 5, it becomes possible to detect the timing before the user enters the vehicle 1 while the power consumption when the vehicle 1 is parked or stopped is suppressed.

The abnormality detection device 100 further includes the brightness value detecting unit 14 for detecting a brightness value in the first image that is an image captured by the camera 3 at timing before the user enters the vehicle 1 and in a state where the light source 4 is turned off, and the first determination unit 15 determines that the amount of external light is less than the reference amount in a case where the brightness value is less than the reference value. As a result, it is possible to determine whether the amount of external light is less than the reference amount using an image captured by the camera 3. That is, there is no need for a dedicated camera nor sensor for determining whether the amount of external light is less than the reference amount.

The reference image is captured by the camera 3 at the time of factory shipment of the vehicle 1. In this manner, an image captured by the camera 3 in the state as of the factory shipment of the vehicle 1 can be set as the reference image. That is, an image suitable for comparison with the second image can be set as the reference image.

The abnormality detection method according to the first embodiment includes: step ST8 of calculating, by the index value calculating unit 18, an index value indicating a sum of edge strengths in a second image that is an image captured by the camera 3 for capturing the vehicle compartment at timing before a user enters the vehicle; step ST9 of calculating, by the differential value calculating unit 19, a differential value between an index value indicating a sum of edge strengths in the reference image, which is an image captured by the camera 3 under imaging conditions equivalent to imaging conditions of the second image before the second image is captured, and the index value calculated by the index value calculating unit 18; step ST10 of determining, by the second determination unit 20, whether the differential value is equal to or greater than a threshold value; and step ST11 of executing, by the warning output control unit 21, control to output a warning in a case where the second determination unit 20 determines that the differential value is equal to or greater than the threshold value. As a result, similar effects to the above-described effects by the abnormality detection device 100 can be obtained.

Note that the present invention may include modifications of any component of the embodiments, or omission of any component of the embodiments within the scope of the present invention.

INDUSTRIAL APPLICABILITY

An abnormality detection device of the present invention is applicable to, for example, an occupant monitoring system.

REFERENCE SIGNS LIST

1: vehicle, 2: imaging device, 3: camera, 4: light source, 5: keyless entry system, 6: receiver, 7: transmitter, 8: output device, 9: control device, 11: approach detecting unit, 12: light-off control unit, 13: first imaging control unit, 14: brightness value detecting unit, 15: first determination unit, 16: light-on control unit, 17: second imaging control unit, 18: index value calculating unit, 19: differential value calculating unit, 20: second determination unit, 21: warning output control unit, 31: processor, 32: memory, 33: processing circuit, 100: abnormality detection device

The invention claimed is:

1. An abnormality detection device for detecting occurrence of an abnormality of a lens of a camera, the abnormality detection device comprising:
processing circuitry configured to
calculate an index value indicating a sum of edge strengths in a second image that is an image captured by the camera for capturing a vehicle compartment at timing before a user enters a vehicle;
calculate a differential value between an index value indicating a sum of edge strengths in a reference image, which is an image captured by the camera under an imaging condition equivalent to an imaging condition of a second image before the second image is captured, and the calculated index value;
determine whether the differential value is equal to or greater than a threshold value; and
output a visual or auditory warning indicating an abnormality has been detected in the lens of the camera in a case where it is determined that the differential value is equal to or greater than the threshold value.

2. The abnormality detection device according to claim 1, wherein the processing circuitry is further configured to
determine whether an amount of external light entering the compartment of the vehicle from outside the vehicle is less than a reference amount, and
wherein the second image is captured by the camera in a state where the amount of external light is less than the reference amount and a light source for imaging by the camera is turned on.

3. The abnormality detection device according to claim 1, wherein the processing circuitry is further configured to
detect approach of the user to the vehicle using an output signal from a receiver for a keyless entry system,
wherein the timing before the user enters the vehicle is timing at which the approach of the user to the vehicle is detected.

4. The abnormality detection device according to claim 2, wherein the processing circuitry is further configured to detect a brightness value in a first image that is an image captured by the camera at timing before the user enters the vehicle and in a state where the light source is turned off, wherein it is determined that the amount of external light is less than the reference amount in a case where the brightness value is less than the reference value.

5. The abnormality detection device according to claim 1, wherein the reference image is captured by the camera at time of factory shipment of the vehicle.

6. The abnormality detection device according to claim 2, wherein the reference image is captured by the camera at time of factory shipment of the vehicle.

7. The abnormality detection device according to claim 3, wherein the reference image is captured by the camera at time of factory shipment of the vehicle.

8. The abnormality detection device according to claim 4, wherein the reference image is captured by the camera at time of factory shipment of the vehicle.

9. An abnormality detection method for detecting occurrence of an abnormality of a lens of a camera, the method comprising:

calculating an index value indicating a sum of edge strengths in a second image that is an image captured by the camera for capturing a vehicle compartment at timing before a user enters a vehicle;

calculating a differential value between an index value indicating a sum of edge strengths in a reference image, which is an image captured by the camera under an imaging condition equivalent to an imaging condition of a second image before the second image is captured, and the calculated index value;

determining whether the differential value is equal to or greater than a threshold value; and outputting a visual or auditory warning indicating an abnormality has been detected in the lens of the camera in a case where it is determined that the differential value is equal to or greater than the threshold value.

* * * * *